July 15, 1958

J. D. LAIRD 2,842,871

EDUCATIONAL DEVICE FOR USE IN TEACHING ARITHMETIC

Filed Sept. 12, 1956

INVENTOR
John D. Laird,
BY
ATTORNEY

July 15, 1958 J. D. LAIRD 2,842,871
EDUCATIONAL DEVICE FOR USE IN TEACHING ARITHMETIC
Filed Sept. 12, 1956 5 Sheets-Sheet 2

INVENTOR
John D. Laird,
BY Gustave Miller
ATTORNEY

July 15, 1958 J. D. LAIRD 2,842,871
EDUCATIONAL DEVICE FOR USE IN TEACHING ARITHMETIC
Filed Sept. 12, 1956 5 Sheets-Sheet 3

INVENTOR
John D. Laird,
BY
ATTORNEY

July 15, 1958 J. D. LAIRD 2,842,871
EDUCATIONAL DEVICE FOR USE IN TEACHING ARITHMETIC
Filed Sept. 12, 1956 5 Sheets-Sheet 4
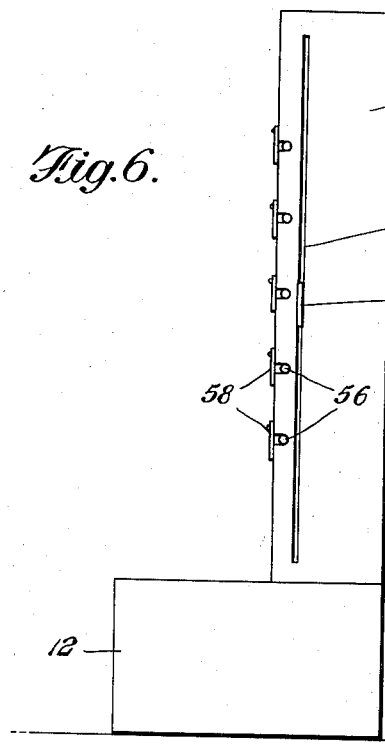
Fig.6.
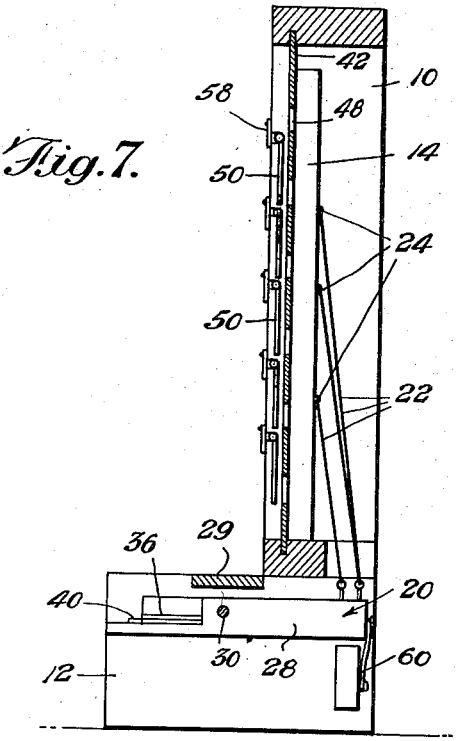
Fig.7.
Fig.8.
INVENTOR
John D. Laird,
BY Gustave Miller
ATTORNEY July 15, 1958  J. D. LAIRD  2,842,871
EDUCATIONAL DEVICE FOR USE IN TEACHING ARITHMETIC
Filed Sept. 12, 1956  5 Sheets-Sheet 5

INVENTOR
John D. Laird,
BY Gustave Miller
ATTORNEY

United States Patent Office

2,842,871
Patented July 15, 1958

2,842,871

EDUCATIONAL DEVICE FOR USE IN TEACHING ARITHMETIC

John D. Laird, Torrington, Wyo.

Application September 12, 1956, Serial No. 609,361

4 Claims. (Cl. 35—31)

This invention relates to an educational device, and it particularly relates to a device for teaching the rudiments of mathematics to young children.

One of the more difficult concepts for a young child to grasp is the fact that the addition of various combinations of different numbers will lead to the same result and that, conversely, the subtraction of different numbers from each other will also lead to the same result.

It is the primary object of the present invention to provide a device which will simplify the teaching of the rudiments of permutations and combinations to a young child.

Another object of the present invention is to provide a device which will quickly indicate to a child whether his addition or subtraction of any given set of numbers is correct.

Another object of the present invention is to provide an educational device for teaching the fundamentals of mathematics which is simple in construction and operation, which is easy to handle, and which is not readily broken.

Other objects of the present invention are to provide an improved educational device, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

Fig. 6 is a side elevational view of the device of Fig. 1.

Fig. 7 is a vertical sectional view of the device of Fig. 1.

Fig. 8 is a front elevational view of the "subtraction" card.

Figure 1:
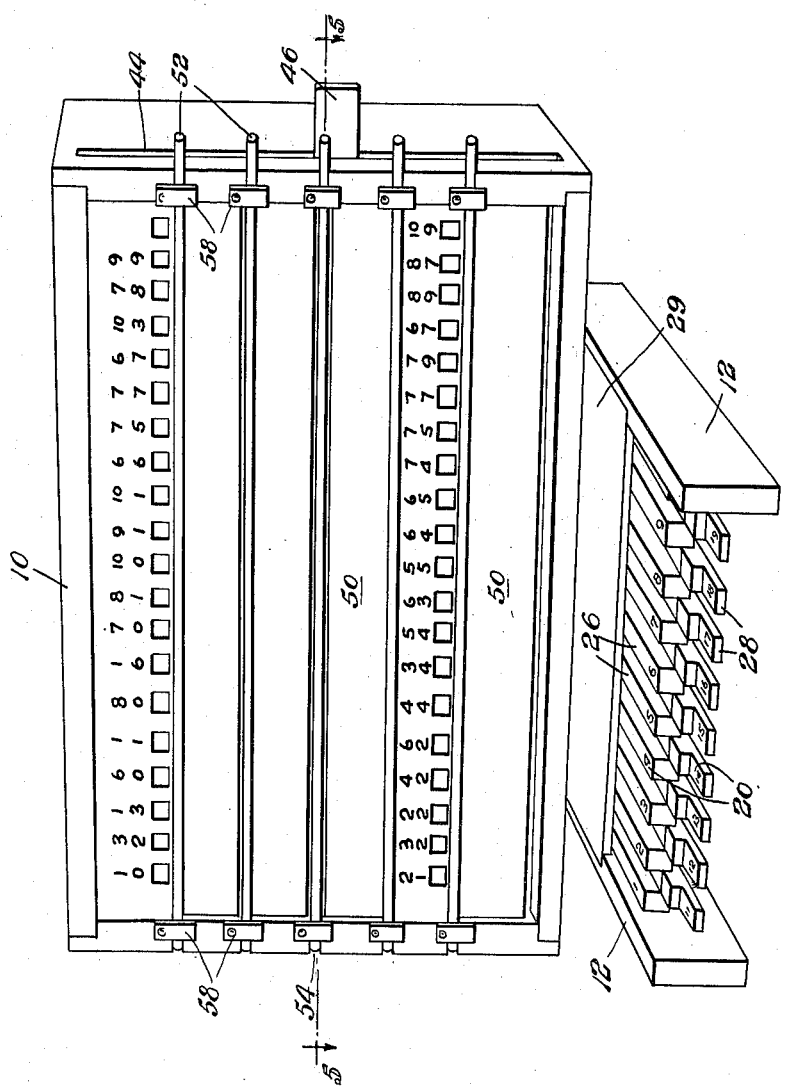
Fig. 1 is a perspective view of a device embodying the present invention, the "addition" card being in place.

Referring now in greater detail to the drawings wherein similar reference characters refer to similar parts, there is shown a frame 10 of generally rectangular shape. This frame is open at front and rear and is set upon a support 12.

Figure 2:
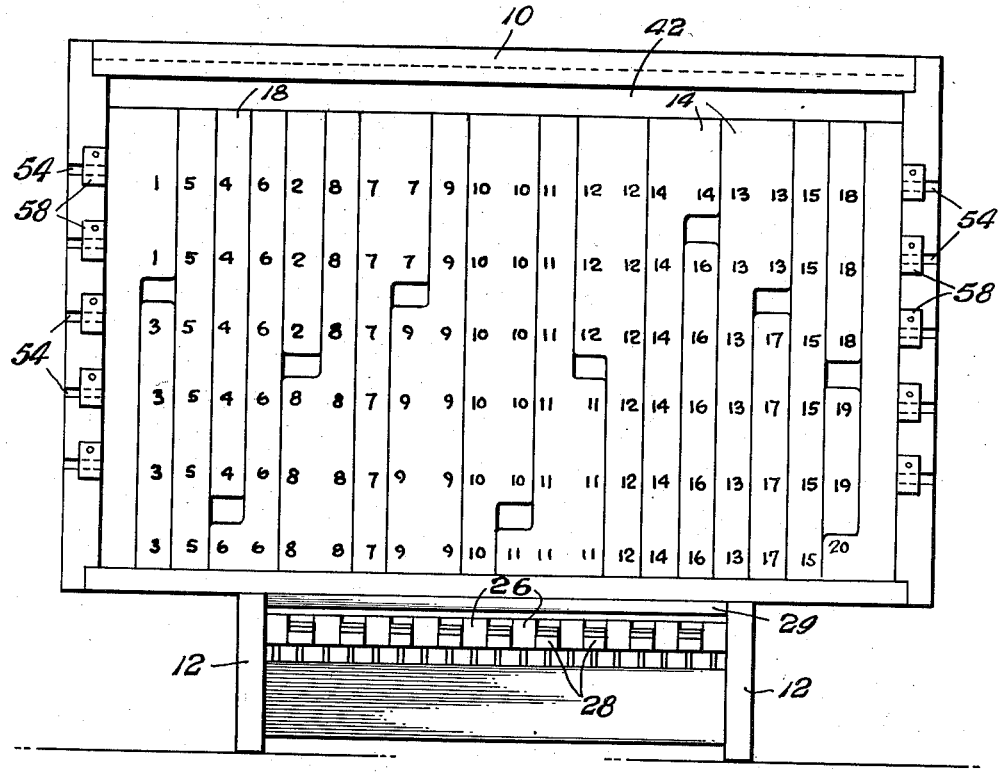
Fig. 2 is a front elevational view of the device of Fig. 1, with the card removed therefrom.

Within the frame 10 are positioned a plurality of vertical slides 14. These slides are of various predetermined sizes and shapes, as best shown in Figs. 1 and 2, and although most of them extend the height of the frame, some are shorter while others have lateral flange portions overlapping the vertical planes of the adjacent shorter slides and overlying them. Each slide is provided with vertically spaced numbers ranging from 1 to 20, and the vertically spaced numbers on each slide are the same as each other. Where a slide is provided with a lateral flange, such flange also carries the same number or numbers. The size and shape of each slide is predetermined in accordance with the numbers it bears and its function in the overall device.

Although the size and shape of the device may be somewhat varied as desired, the preferable embodiment illustrated has its slides a maximum length of about 9½ inches while its width is about ¾ inch. If a slide is provided with a flange on one or two sides, each flange is also about ¾ inch in width. The shorter slides vary in length from about 3 inches as at 16, to about 8 inches, as at 18. The center of each number on the individual slides is about 1½ inches from the center of the next lower or higher number.

Each slide is vertically movable within the frame and is actuated by a key 20. There is a key 20 for each slide and all the keys are positioned on the support 12. Each slide is connected to its corresponding key by a steel wire 22, one end of which is attached to the key by means of the eyelet and the opposite end of which is hooked through an eyelet on the rear face of the slide, as at 24. By means of this hooking arrangement, the slide can be readily released for removal, cleaning, changing, etc., whereas the hook connection yet provides a strong attachment.

Figure 3:
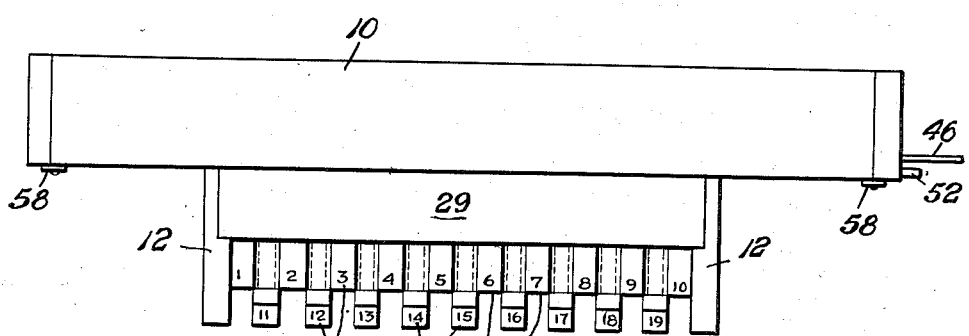
Fig. 3 is a top plan view of the device of Fig. 1.

The keys 20 are arranged in two sets, one set 26 are shorter in length and the other set 28 are longer. The shorter and longer keys are alternately arranged, as best shown in Fig. 3. Each of the shorter keys 26 is connected by a wire 22 to one of the slides having numbers between "1" and "10." The other keys 28 are each connected to a corresponding slide having numbers between "11" and "19." A guard plate 29 partially overlies the keys.

The keys 20, both those of the shorter set 26 and those of the longer set 28, are pivotally arranged on a through shaft 30 extending across the frame and through openings 32 in the keys.

Figure 12:
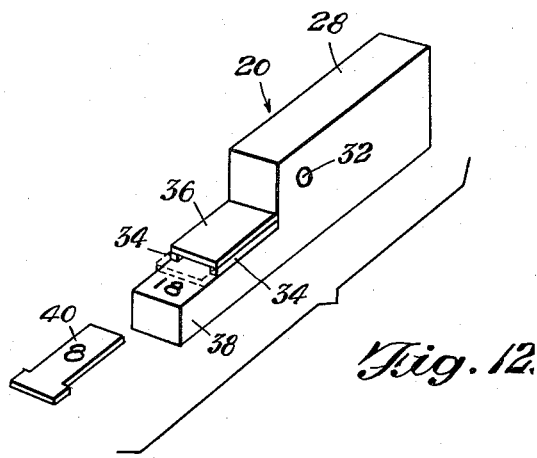
Fig. 12 is a perspective view of one of the keys showing the slidable insert removed therefrom.

The longer keys 28 are each provided with a channel or pocket formed by a pair of spaced ribs 34 upon which rests a plate 36. This pocket extends over the top surface of the recessed front end thereof. As illustrated in Fig. 12, a number corresponding to its connected slide is marked on the front end of each key. In the key illustrated in Fig. 12, the number is "18." An insert 40 having a front flange bearing the number "8" is illustrated as being slidably insertable into the pocket. When this is done, the number "8" overlies and hides the number "18." Each key 28, having a number from "11" to "19" is similarly provided with an insert bearing a number which is ten less than its own number.

Figure 5:
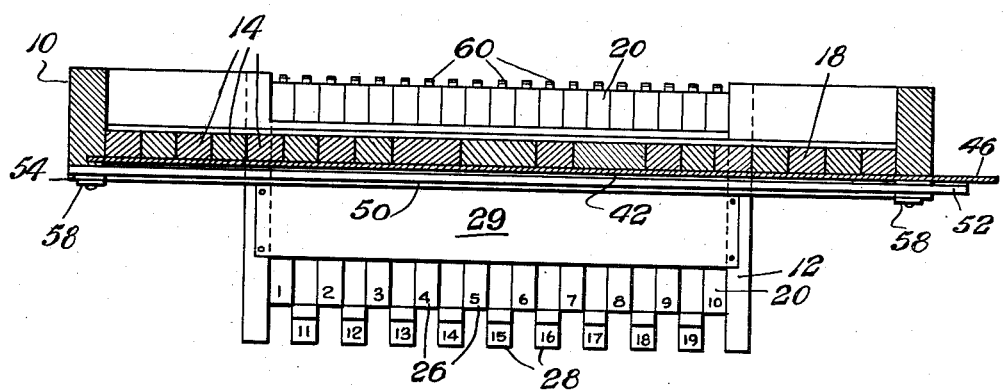
Fig. 5 is a cross-sectional view on line 5—5 of the device of Fig. 1.

When the device is to be used, an "addition" card 42, made of cardboard, plastic, wood, or any other desired material, is inserted through a slot 44 in the side of the frame, as shown in Fig. 5. The card is inserted so that it completely overlies the front of the slide 14. A handle 46 extends from one edge of the card and projects outside the frame in a position where it can be easily grasped.

The card 42 is provided six horizontal rows of rectangular openings 48, there being twenty of such openings in each row. The openings are vertically spaced from each other by a predetermined amount depending on the constructional details of the device. In the device illustrated, it is a distance of about 1½ inches to correspond to the vertical distances between the centers of the numbers on the slides. Above each opening or window 48 there are printed two numbers, one below the other in a set.

With card 42 in place, when a key 20 is pressed down, it pivots or rocks on shaft 30. This moves the corresponding wire 22 which acts to lift up the corresponding slide 14. The rocking movement of the key is such that the slide is lifted to just the extent required to move each of its numbers into coincidence with the vertical row of windows 48 on the card. This number on the slide which appears in each window is the sum of the two numbers on the card above the window.

In order to avoid any confusion, a removable flap 50 is provided to cover each horizontal row of windows and their corresponding numbers. One flap can be turned up at a time to uncover the desired windows.

Each flap 50 is provided with a lateral pin on each end, these pins being shown at 52 and 54. These pins are adapted to fit into corresponding grooves 56 either side of the frame, after they have first been snapped under corresponding spring clamps 58 on the frame. The pins 52 extend beyond the frame to serve as handles for manipulating the flaps.

After the proper key has been pressed, it will indicate the correct answer. The proper key is that bearing the number corresponding to the correct sum of the two figures above the window being used. When the key is released, it automatically returns to its normal position under the influence of a spring 60, shown in Fig. 6, which connects the rear end of the key to the rear of the support.

Figure 4:
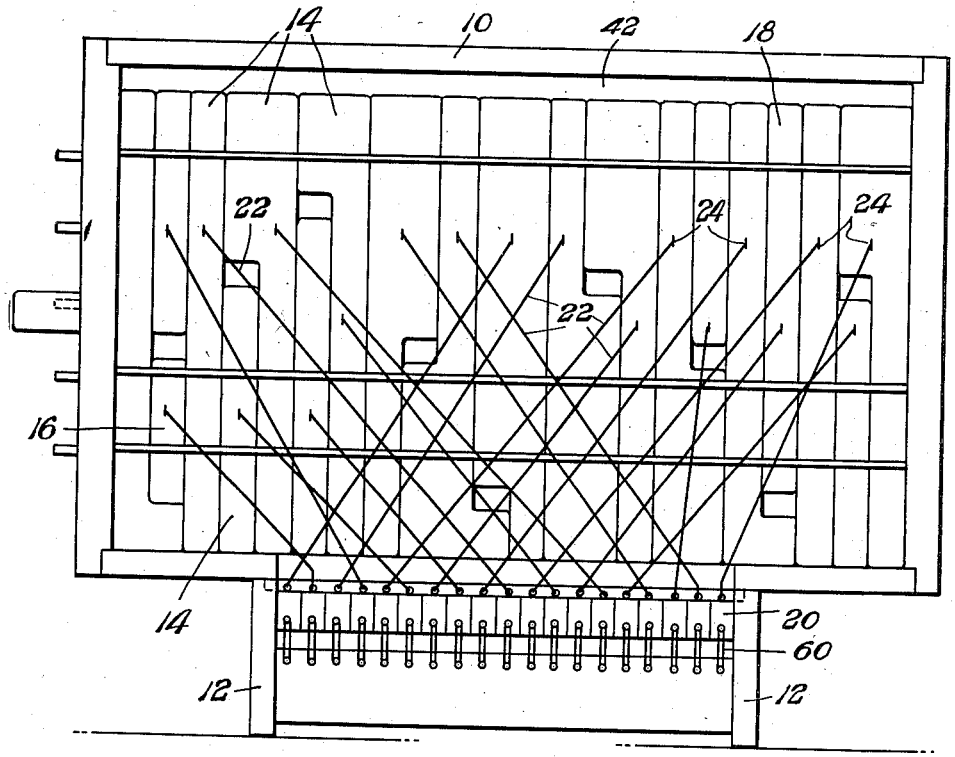
Fig. 4 is a rear elevational view of the device of Fig. 1.
Figure 9:
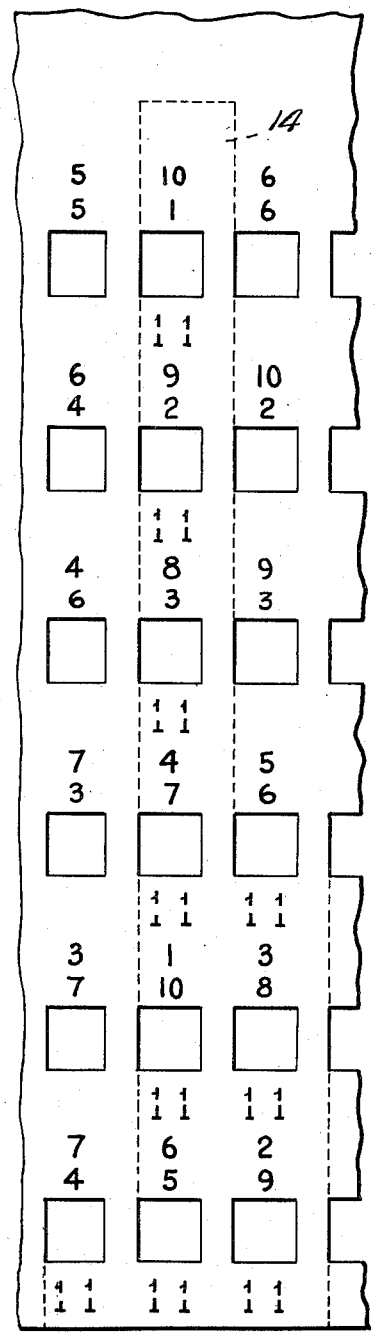
Fig. 9 is a fragmentary, enlarged, detailed view of a portion of the "addition" card overlying one of the slides.
Figures 10, 11:
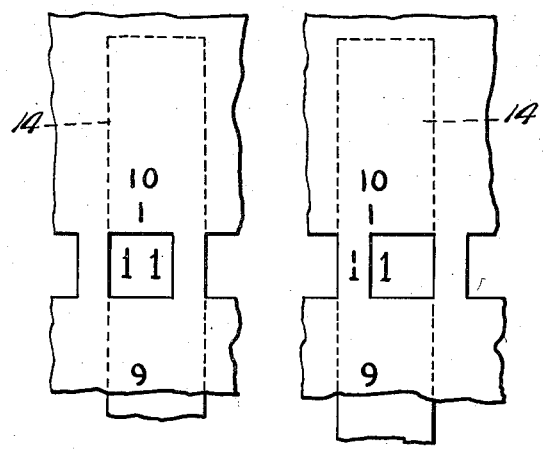
Fig. 10 is a fragmentary view of Fig. 7 showing the "addition" card in one position of adjustment.
Fig. 11 is a view similar to Fig. 9, showing the card in a second position of adjustment.

When it is desired to use the device to teach subtraction, the handle 46 of the "addition" card 42 is grasped and pulled so that the "addition" card is moved to the right, as viewed in Fig. 4. It is pulled to the right a sufficient distance so that the windows corresponding to each of the double numbers, that is "11" to "19," cover up the first digit of each of these numbers. This is illustrated in Figs. 9 and 10, where the two positions of the card are shown. Then, the "subtraction" card 62, shown in Fig. 8, is put in place. It is put in place by removing the flaps 50 and by then placing the "subtraction" card directly over the face of the "addition" card. Any convenient or desired means is used to hold it in place, such as pins, bolts, screws, or the like.

The "subtraction" card 62, as can be seen in Fig. 8, is provided with windows 64 only on the right hand portion thereof. These windows are also arranged in horizontal rows vertically spaced from each other by distances similar to the windows of the "addition" card. Here, too, a pair of vertically arranged numbers are provided above each window. An extra window and corresponding numbers are provided in the bottom row.

When the card 62 is placed over the "addition" card 42, after the card 42 has been moved to the position indicated in Fig. 11, the numbers "11" to "19" on their corresponding slides, when vertically raised by their keys, will appear as "1" to "9" within the corresponding windows 64 of the card 62.

The inserts 40 are now inserted into their respective pockets on their respective keys 28 so that the numbers "11" to "19" on these keys become "1" to "9." The flaps are then returned to position.

Now, when the child desires to indicate the answer to any of the subtraction problems above the windows 64, he presses the appropriate key 28. If it is the correct key, the correct answer will appear in the window.

If the child presses one of the keys 26, nothing will appear since the windows corresponding thereto are covered by the blank left hand portion of the card 62. These keys 26 are, therefore, in effect, out of play during the subtraction procedure. Since the keys 26 are positioned on a higher plane than keys 28, it is easy for the child to realize which set of keys can be used in both addition and subtraction and which can be used only for addition.

Although particular combinations of numbers have been illustrated, this is for illustrative purposes only. Various combinations and permutations can be used as desired merely by substituting one card for another. As many different cards can be used as desired and their combinations of numbers can be made difficult as the age or intelligence level of the child increases.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. An educational device comprising a support, a frame on said support, an open front face on said frame, a plurality of vertically slidable slides in said frame, indicia on said slides forming individual numbers, operating means on said support for vertically moving said slides in said frame, and a windowed mask movable into and out of position in said frame overlying the front faces of said slides.

2. The device of claim 1 wherein said mask is provided with windows arranged in such manner that when the mask is positioned in front of said slides, said windows will frame the numbers on said slides when said slides are vertically raised by said operating means.

3. In combination an open-faced frame, a support for said frame, a plurality of vertically movable slides in said frame, operating means on said support for raising said slides individually, a masking card adapted to be moved into and out of a position overlying the front face of said slides, windows in said masking card set in predetermined relationship to each other, indicia on the front faces of said slides and on said masking card adjacent each window, the windows on said masking card being so arranged that the indicia on said slides appear framed therein when said slides are raised by said operating means, means to move said masking card horizontally relative to said frame, and a second masking card insertable over the front face of said first masking card, said second card having one portion masking some of the windows of said first card and another portion provided with windows corresponding to the windows of said first card.

4. The combination of claim 3 wherein the windows on said cards are arranged in horizontal and vertical rows, and wherein individually removable flaps are provided on said frame to mask each horizontal row of windows below the top row and its corresponding indicia.

References Cited in the file of this patent

UNITED STATES PATENTS

| | | |
|---|---|---|
| 564,396 | Sheppard | July 21, 1896 |
| 958,781 | Spencer | May 24, 1910 |
| 1,278,425 | Benningfield | Sept. 10, 1918 |
| 1,867,888 | Obidine | July 19, 1932 |
| 2,293,127 | Fishack et al. | Aug. 18, 1942 |
| 2,317,107 | Oesch | Apr. 20, 1943 |
| 2,458,863 | Kroenlein | June 11, 1949 |
| 2,624,126 | Bolognio et al. | June 6, 1953 |

FOREIGN PATENTS

| | | |
|---|---|---|
| 407,274 | Great Britain | Oct. 11, 1933 |